(12) United States Patent
Chen et al.

(10) Patent No.: US 11,518,613 B2
(45) Date of Patent: Dec. 6, 2022

(54) DISTRIBUTION STATION

(71) Applicant: BEIJING JINGDONG QIANSHI TECHNOLOGY CO., LTD., Beijing (CN)

(72) Inventors: Ying Chen, Beijing (CN); Zhao Wang, Beijing (CN); Jun Xiao, Beijing (CN); Yafang Zhang, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/276,453

(22) PCT Filed: Jul. 18, 2019

(86) PCT No.: PCT/CN2019/096612
§ 371 (c)(1),
(2) Date: Mar. 15, 2021

(87) PCT Pub. No.: WO2020/057244
PCT Pub. Date: Mar. 26, 2020

(65) Prior Publication Data
US 2022/0033185 A1 Feb. 3, 2022

(30) Foreign Application Priority Data
Sep. 21, 2018 (CN) .......................... 201811109756.4

(51) Int. Cl.
*B65G 1/133* (2006.01)
*B65G 1/06* (2006.01)
(52) U.S. Cl.
CPC ............... *B65G 1/133* (2013.01); *B65G 1/06* (2013.01)

(58) Field of Classification Search
CPC .................................. B65G 1/133; B65G 1/06
See application file for complete search history.

(56) References Cited

U.S. PATENT DOCUMENTS 4,574,962 A * 3/1986 Tabler ................... B65G 21/22
312/268
4,639,187 A 1/1987 Maruyama et al.
(Continued)

FOREIGN PATENT DOCUMENTS

BE 659532 A 5/1965
CN 106056779 A 10/2016
(Continued)

OTHER PUBLICATIONS

The International Search Report dated Sep. 26, 2019 by the WIPO from Application No. PCT/CN2019/096612.
(Continued)

*Primary Examiner* — Jonathan Snelting
(74) *Attorney, Agent, or Firm* — Qinghong Xu

(57) ABSTRACT

A distribution station includes a base, a housing, a rotating shelf, a distribution vehicle, a sorting device, and a control system. The housing is provided on the base, and is provided with a goods access port and an access door. The rotating shelf is provided on the base and located in the housing. The rotating shelf includes a rotating shaft, a transmission belt, a plurality of shelf units, and a driving mechanism. The distribution vehicle enters and exits the housing via the access door and is used to transport goods. The sorting device is provided on the base and located in the housing. The sorting device is used to pick up goods and place the same between the distribution vehicle and the shelf units. The control system is used to control the driving mechanism and the sorting device.

8 Claims, 7 Drawing Sheets

(56) References Cited

U.S. PATENT DOCUMENTS

| | | | | |
|---|---|---|---|---|
| 4,821,887 A * | 4/1989 | Iemura | B65G 1/133 | 312/134 |
| 5,161,698 A * | 11/1992 | Hatouchi | B65G 1/133 | 211/1.56 |
| 5,207,335 A * | 5/1993 | Voelz | B65G 1/133 | 312/198 |
| 5,449,262 A * | 9/1995 | Anderson | B65G 1/133 | 414/280 |
| 5,863,172 A * | 1/1999 | Pearson | B65G 1/133 | 198/833 |
| 6,714,490 B2 * | 3/2004 | Ostwald | G11B 15/685 | 369/30.5 |
| 6,728,597 B2 * | 4/2004 | Didriksen | G07F 17/13 | 700/214 |
| 6,845,291 B2 * | 1/2005 | Tahira | B65G 1/0435 | 700/214 |
| 9,120,624 B1 * | 9/2015 | Cassady | G06Q 10/0836 | |
| 10,934,090 B2 * | 3/2021 | Leow | B65G 1/133 | |
| 2005/0008464 A1 * | 1/2005 | Emmerling | B65G 1/133 | 414/331.03 |

FOREIGN PATENT DOCUMENTS

| | | |
|---|---|---|
| CN | 106204947 A | 12/2016 |
| CN | 107516385 A | 12/2017 |
| CN | 107633618 A | 1/2018 |
| CN | 208915981 U | 5/2019 |
| EP | 3296965 A1 | 3/2018 |
| EP | 2796390 B1 | 7/2018 |
| JP | S53133103 A | 11/1978 |
| JP | S58139902 A | 8/1983 |
| JP | H02239099 A | 9/1990 |
| JP | 2018144927 A | 9/2018 |
| WO | 2011036498 A2 | 3/2011 |

OTHER PUBLICATIONS

The Extended European Search Report dated May 17, 2022 of European Patent No. 19862650.9.

Notice of Reasons for Refusal dated Jun. 7, 2022 of Japanese Patent Application No. 2021-512533.

* cited by examiner

DISTRIBUTION STATION

CROSS REFERENCE

This application is based upon International Application No. PCT/CN2019/096612, filed on Jul. 18, 2019, which claims priority to Chinese Patent Application No. 201811109756.4, filed on Sep. 21, 2018, the content of which is hereby incorporated by reference in its entirety.

TECHNICAL FIELD

The present disclosure relates to the technical field of distribution equipment for logistics warehousing, and in particular to a distribution station.

BACKGROUND

In the existing logistics distribution model, the "last mile" of goods distribution has always been an area of vigorous research in this field. In the current mode of operation, workers are required to drive logistics vehicles through the streets and alleys, and the delivery efficiency is often affected by weather, road conditions, and the timeliness of the recipient's pick-up. In order to alleviate the negative impact of this model, multiple outlets are generally established in the city, and each outlet is equipped with relevant staff, manpower is responsible for the transshipment of goods in the same area or helping customers to pick up the goods, and unmanned vehicles will carry out the goods distribution, and when the unmanned vehicle is in use, the package is loaded manually, the degree of autonomy in this mode is still not high, especially in the maintenance of the station's work and operation.

The existing distribution modes and goods transshipment methods are highly dependent on manual labor, resulting in unstable distribution efficiency, not only the cost is high, the efficiency is low, but also the error rate will be generated due to the different qualities of the operators, which affects the customer experience and restricts the development of the logistics industry to a certain extent.

SUMMARY

According to one aspect of the present disclosure, a distribution station is provided. Where, the distribution station includes a base, a housing, a rotating shelf, a distribution vehicle, a sorting device and a control system. The housing is provided on the base and provided with a goods access port and an access door. The rotating shelf is provided on the base and located in the housing, the rotating shelf includes a rotating shaft, a transmission belt, a plurality of shelf units and a driving mechanism. The rotating shaft is provided on the base vertically and provided with a rotating wheel concentric with the rotating shaft. The transmission belt is wound around the outer circumference of the rotating wheel. The plurality of shelf units are provided on the transmission belt at intervals in a horizontal direction, and the shelf units are configured to store goods. The driving mechanism connected to the rotating shaft in transmission, the driving mechanism is configured to drive the rotating shaft to rotate around its axial direction, so that at least one of the plurality of shelf units corresponds to the goods access port. The distribution vehicle is configured to enter and exit the housing through the access door and transport the goods. The sorting device provided on the base and located in the housing, the sorting device is configured to pick up and place the goods between the distribution vehicle and the shelf units. The control system is configured to control the driving mechanism and the sorting device.

According to one of the embodiments of the present disclosure, the rotating shelf includes a plurality of rotating shafts, the plurality of rotating shafts are arranged at intervals along a linear direction, heights of the rotating wheels provided on the plurality of rotating shafts are the same, and the transmission belt is wound around a plurality of the rotating wheels.

According to one of the embodiments of the present disclosure, the rotating shelf includes two rotating shafts.

According to one of the embodiments of the present disclosure, each of the rotating shafts is provided with a plurality of the rotating wheels located at different heights, the plurality of the rotating wheels provided on each of the rotating shafts have the same number and the heights of the plurality of the rotating wheels on each of the rotating shafts are corresponding to each other, the plurality of the rotating wheels located at the same height of the plurality of the rotating shafts define a group of the rotating wheels, a plurality of groups of the rotating wheels are respectively wound with a plurality of the transmission belts, and each of the shelf units is provided on the plurality of the transmission belts.

According to one of the embodiments of the present disclosure, each of the rotating shafts is provided with two rotating wheels respectively located at a top end and a bottom end of each of the rotating shafts, a transmission belt is wound around the plurality of the rotating wheels located at the top end of each of the plurality of the rotating shafts, another transmission belt is wound around the plurality of the rotating wheels located at the bottom end of each of the plurality of the rotating shafts, each of the shelf units is connected to two transmission belts.

According to one of the embodiments of the present disclosure, the rotating wheel is a sprocket, and the transmission belt is a chain.

According to one of the embodiments of the present disclosure, the shelf units are provided with a plurality of goods storage grids sequentially distributed in a vertical direction, the goods access port is provided with a plurality of opening and closing doors, the plurality of the opening and closing doors correspond to the plurality of the goods storage grids respectively.

According to one of the embodiments of the present disclosure, the distribution station further includes a man-machine interface, the man-machine interface is provided on the housing and connected to the control system, the man-machine interface is configured for a user to input goods access instructions, and converting the goods access instructions into control signals and sending the control signals to the control system.

According to one of the embodiments of the present disclosure, the driving mechanism includes a driving motor and a driving belt, the driving motor is provided in the housing and is provided with an output end, the driving belt is connected between the output end and the rotating shaft, the driving motor is configured to drive the rotating shaft to rotate through a transmission of the driving belt.

According to one of the embodiments of the present disclosure, the distribution station further includes a rotating platform, the rotating platform is rotatably provided on the base and located in the housing, the rotating platform is configured to adjust the direction of the distribution vehicle through its own rotation when the distribution vehicle is parked on the rotating platform.

DETAILED DESCRIPTION

Figure 1:
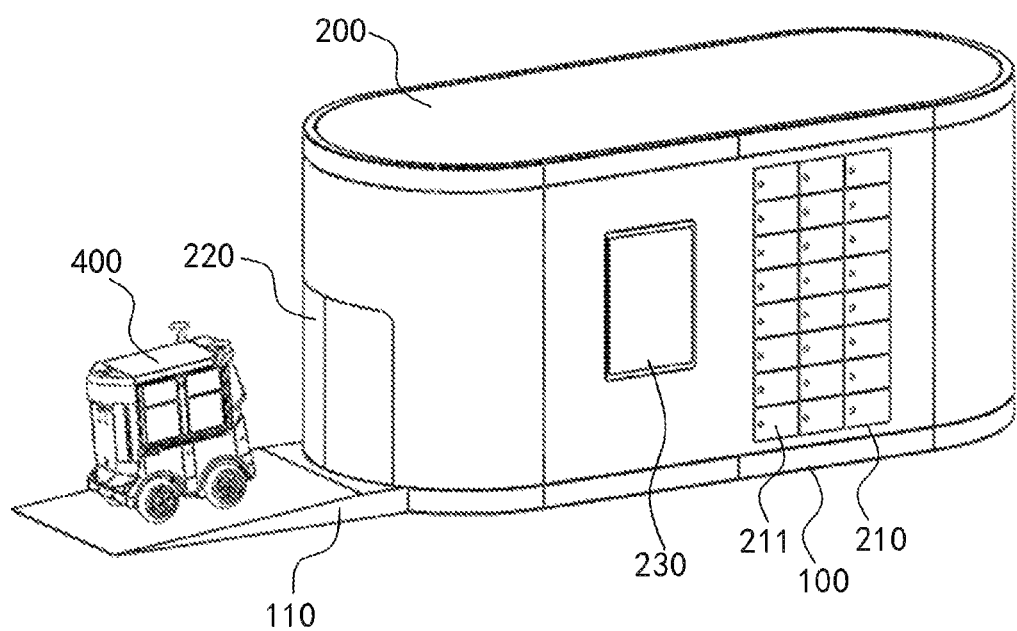
FIG. 1 is a structural schematic diagram showing a distribution station according to one or more exemplary embodiment.

The same reference numerals in the figures represent the same or similar structures, and thus their detailed descriptions will be omitted. Exemplary embodiments will now be described more fully with reference to the accompanying drawings. However, the example embodiments can be implemented in various forms, and should not be construed as being limited to the embodiments set forth herein; on the contrary, these embodiments are provided so that the present disclosure will be comprehensive and complete, and will fully convey the concept of exemplary embodiments to those skilled in the art.

Refer to FIG. 1, which representatively shows the structural schematic diagram of the distribution station provided by the present disclosure. In this exemplary embodiment, the distribution station provided in the present disclosure is applied to the field of logistics transportation, especially take the "last mile" where the distribution station is used for goods distribution as an example. It is easy for those skilled in the art to understand that, in order to apply the relevant design of the present disclosure to other types of logistics and transportation links or other fields, various modifications, additions, substitutions, deletions or other changes are made to the following specific embodiments, these changes are still within the scope of the principle of the distribution station proposed in this disclosure.

Figure 2:
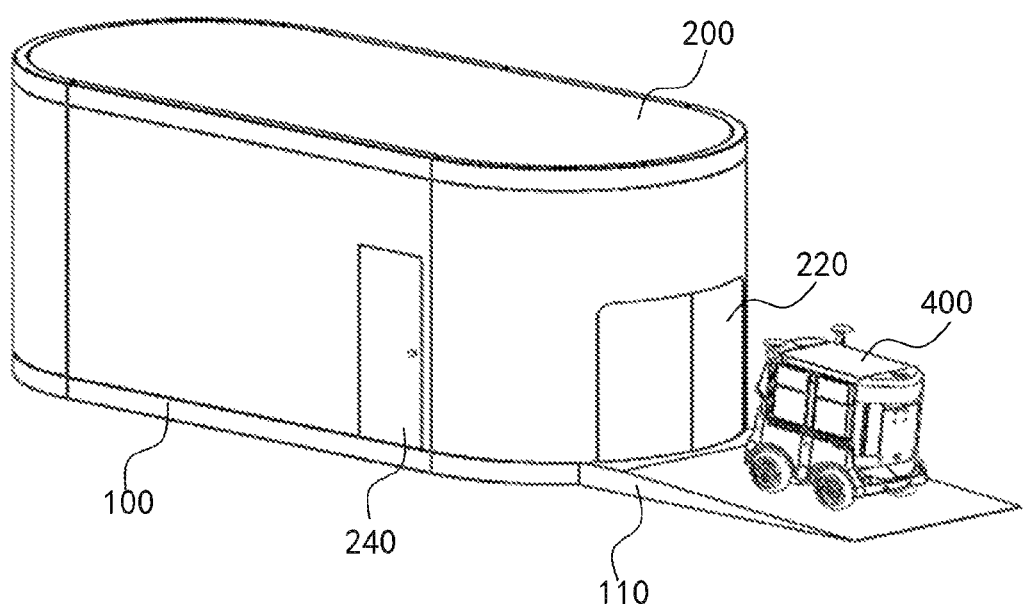
FIG. 2 is a structural schematic diagram from another angle of FIG. 1.
Figure 3:
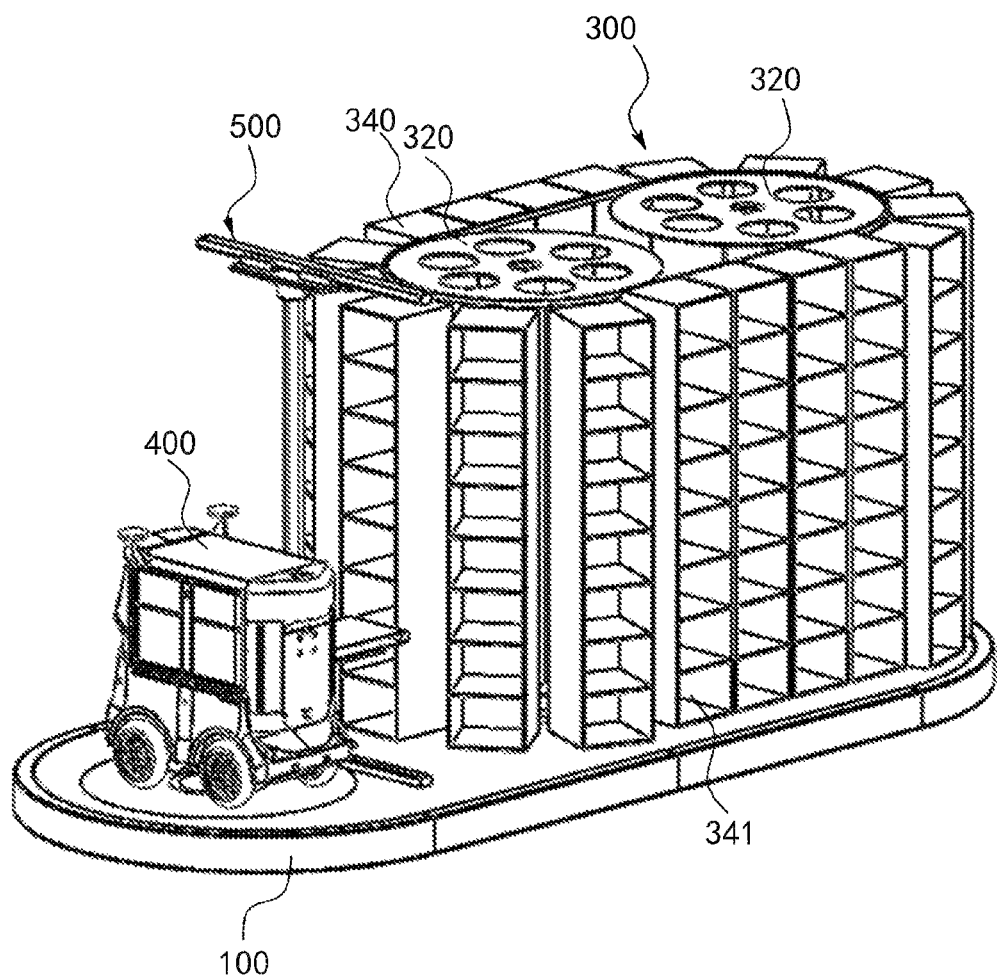
FIG. 3 is a schematic diagram of a part of the structure of the distribution station shown in FIG. 1.
Figure 4:
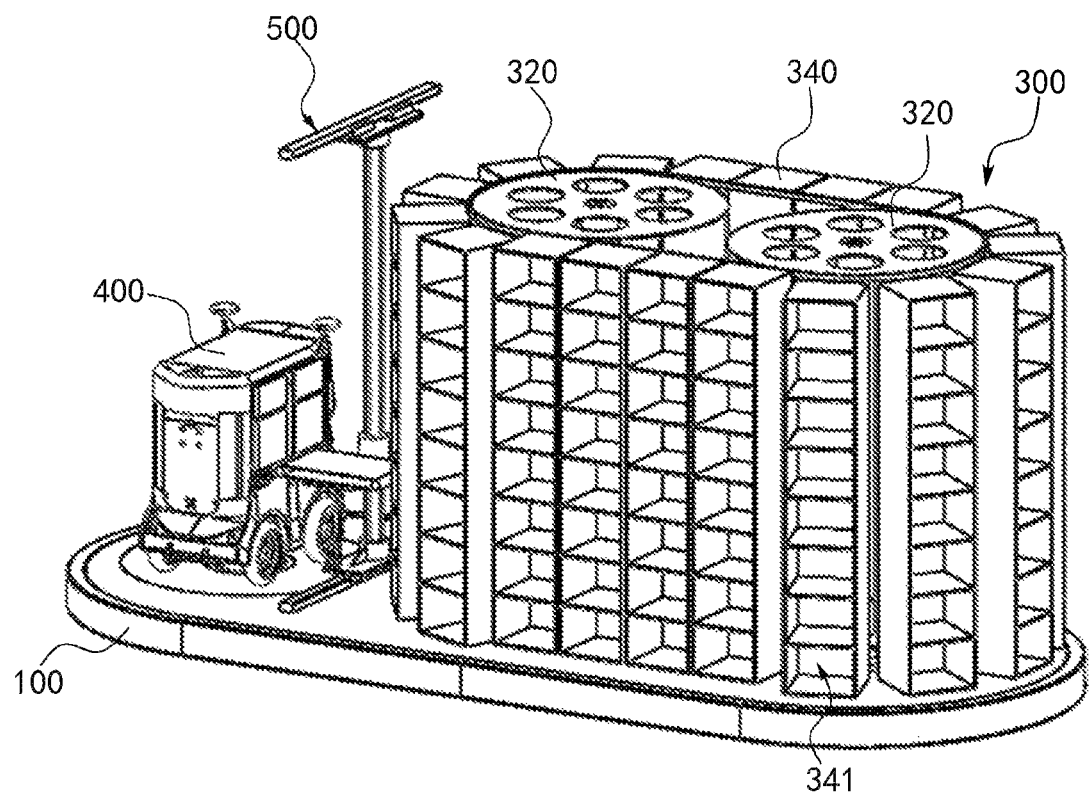
FIG. 4 is a structural schematic diagram from another angle of FIG. 3.
Figure 5:
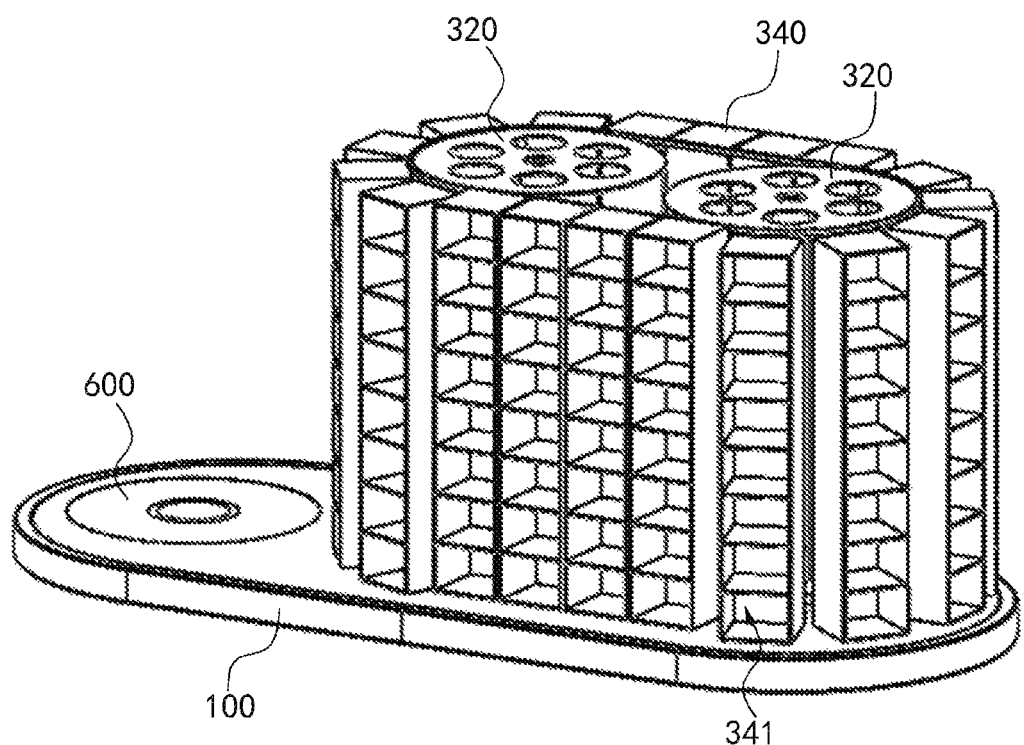
FIG. 5 is a schematic diagram of another part of the structure of the distribution station shown in FIG. 1.
Figure 6:
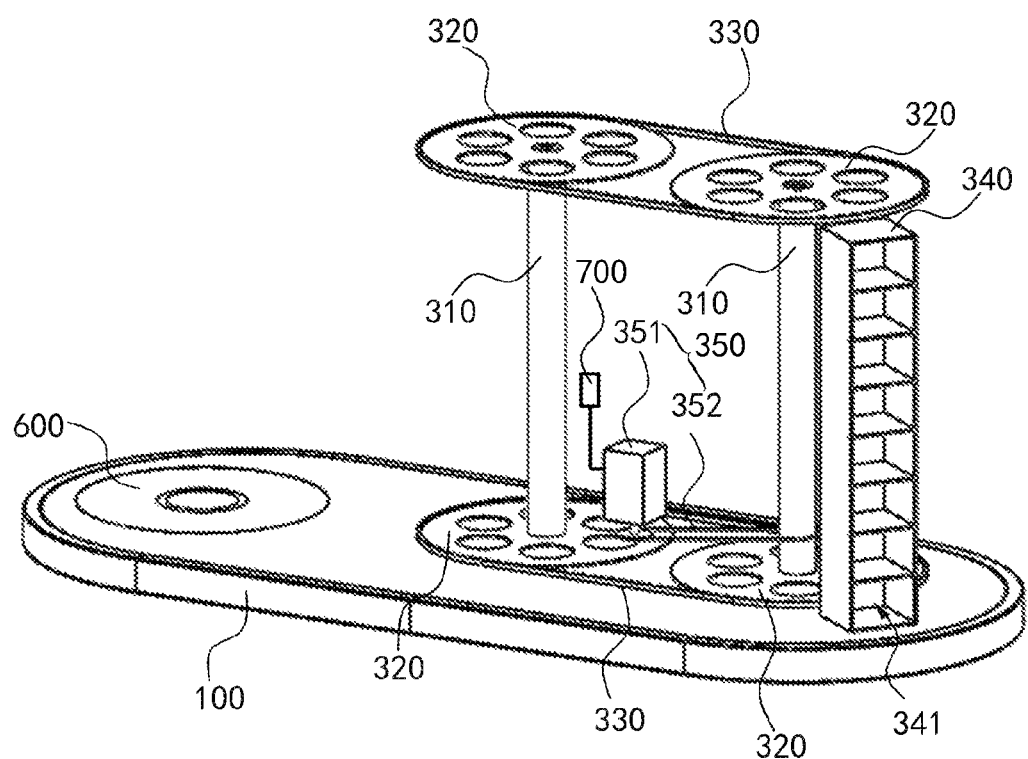
FIG. 6 is a schematic diagram of another part of the structure of the distribution station shown in FIG. 1.
Figure 7:
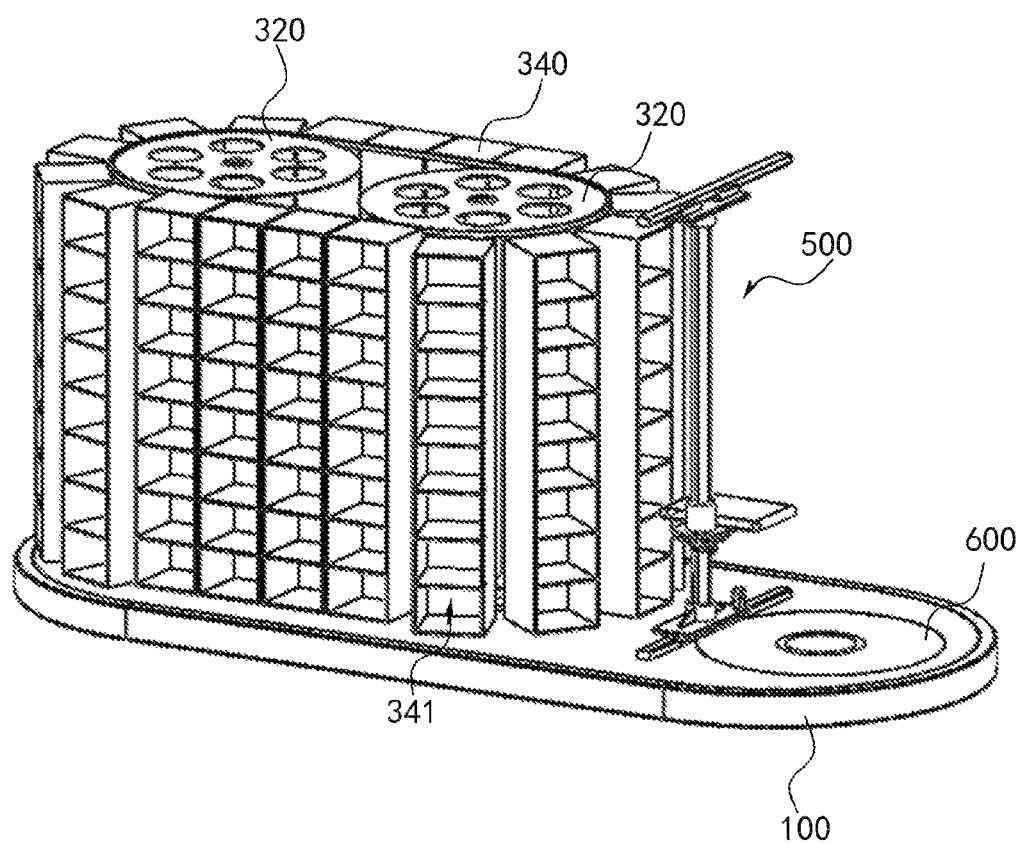
FIG. 7 is a schematic diagram of another part of the structure of the distribution station shown in FIG. 1.

As shown in FIG. 1, in this embodiment, the distribution station mainly includes a base 100, a housing 200, a rotating shelf 300, a distribution vehicle 400, a sorting device 500, and a control system 700. Refer to FIGS. 2 to 7 in conjunction, and FIG. 2 representatively shows a structural schematic diagram from another angle of FIG. 1; FIG. 3 representatively shows a schematic diagram of a part of the structure of the distribution station that can embody the principles of the present disclosure, which specifically shows a structural schematic diagram of the distribution station after the housing 200 is removed; FIG. 4 representatively shows a structural schematic diagram from another angle of FIG. 3; FIG. 5 representatively shows a schematic diagram of another part of the structure of the distribution station that can embody the principles of the present disclosure, which specifically shows the structure diagram of the distribution station after the housing 200, the distribution vehicle 400 and the sorting device 500 are removed; FIG. 6 representatively shows a schematic diagram of another part of the structure of the distribution station that can embody the principles of the present disclosure, which specifically shows the structural schematic diagram of the distribution station after the housing 200, the distribution vehicle 400, the sorting device 500 and the shelf units 340 are removed; FIG. 7 representatively shows a schematic diagram of another part of the structure of the distribution station that can embody the principles of the present disclosure, which specifically shows the schematic structural diagram of the distribution station after the housing 200 and the distribution vehicle 400 are removed. The structures, connection modes, and functional relationships of the main components of the distribution station proposed in the present disclosure will be described in detail below in conjunction with the above-mentioned drawings.

As shown in FIGS. 1 to 5, in this embodiment, the housing 200 can also be understood as the overall frame of the distribution station, the housing 200 is provided on the base 100 and is formed with an accommodating space for accommodating the rotating shelf 300, the sorting device 500 and the distribution vehicle 400, so that the housing 200 can provide functions such as waterproofing, electricity proofing, and heat preservation to the above-mentioned mechanisms provided therein. The rotating shelf 300 is provided on the base 100 and located in the housing 200, the rotating shelf 300 can expose the shelf units 340 in which the goods are stored or the goods are to be stored to the goods access port 210 opened in the housing 200. The distribution vehicle 400 can enter and exit the housing 200 through an access door 220 provided on the housing 200, and the distribution vehicle 400 is used to transport goods. The sorting device 500 is provided on the base 100 and is located in the housing 200, when the distribution vehicle 400 enters the distribution station, the sorting device 500 can pick and place goods between the distribution vehicle 400 and the shelf units 340. The control system 700 is used to control a driving mechanism 350 and the sorting device 500, at the same time, the control system 700 can collect other working status information of the distribution station, such as the access status information of the rotating shelf 300, and feed back to the corresponding control instructions according to the data information. Accordingly, the distribution station proposed in the present disclosure can be used as a transit station for goods distribution, which can automatically sort, receive and deliver goods, and at the same time have functions such as self-pickup, sales, and sending goods, and satisfies various functions that need to be realized in the last mile of distribution.

As shown in FIGS. 3 to 6, in this embodiment, the rotating shelf 300 mainly includes two rotating shafts 310, two transmission belts 330, a plurality of shelf units 340, and a driving mechanism 350. Specifically, the rotating shafts 310 are provided on the base 100, each of the rotating shafts 310 is vertical and can rotate axially around itself, and the two rotating shafts 310 are horizontally spaced apart. Each rotating shaft 310 is provided with two rotating wheels 320 respectively located at the top and bottom ends of the rotating shaft 310, and the rotating wheels 320 are concentric with the rotating shaft 310 provided thereon. The two rotating wheels 320 at the top ends of the two rotating shafts 310 are jointly wound with a transmission belt 330, and the two rotating wheels 320 at the bottom ends of the two rotating shafts 310 are jointly wound with another transmission belt 330. A plurality of shelf units 340 are provided on the transmission belt 330 at intervals in the horizontal direction for storing goods, and each shelf unit 340 is connected to the two transmission belts 330 at the same time. The driving mechanism 350 is connected to one of the rotating shafts 310 in transmission for driving the rotating shaft 310 to rotate axially around itself, therefore, the plurality of shelf units 340 are driven to rotate around by the rotating wheels 320 and the transmission belts 330, and at least one of the plurality of shelf units 340 is exposed to the goods access port 210 opened on the housing 200 for the user to pick up or store goods.

It should be noted that in other exemplary embodiments of the distribution station proposed in the present disclosure, the rotating shelf 300 is not limited to the design of the two rotating shafts 310, the two transmission belts 330, and the related rotating wheels 320. For example, the number of the rotating shafts 310 may be one or more than two, and when there are multiple rotating shafts 310, the multiple rotating shafts 310 are arranged on the base 100 at intervals along a linear direction. Furthermore, for each rotating shaft 310, there may be one or more than two rotating wheels 320, and when there are a plurality of rotating wheels 320 on the rotating shaft 310, the plurality of rotating wheels 320 are arranged at different height positions of the rotating shaft 310 at intervals, and not limited to the top and bottom ends of the rotating shaft 310. Moreover, when there are a plurality of rotating shafts 310, the number of rotating wheels 320 provided on each rotating shaft 310 is the same, and the plurality of rotating wheels 320 provided on the plurality of rotating shafts 310 are respectively located in groups at the same multiple height positions. In this arrangement, a transmission belt 330 is wound on the outer circumference of a group of rotating wheels 320 at the same height and arranged on different rotating shafts 310. Therefore, the number and installation height of the transmission belts 330 can also be flexibly adjusted with reference to the design of the rotating wheels 320. In addition, when there are a plurality of rotating shafts 310, the driving mechanism 350 can drive at least one of the plurality of rotating shafts 310, and can also drive all the rotating shafts 310. Where, when the driving mechanism 350 drives the plurality of rotating shafts 310, the driving mode of the plurality of rotating shafts 310 is synchronous driving. When the driving mechanism 350 drives one of the plurality of rotating shafts 310, the rotating shaft 310 that is in transmission connection with the driving mechanism 350 is the active shaft, and the remaining rotating shafts 310 are driven shafts, which can also be driven by the active shaft to rotate synchronously.

Further, as shown in FIGS. 1 to 4, in this embodiment, the overall appearance of the rotating shelf 300 is substantially a columnar structure with an elliptical cross section. Specifically, the middle part of the overall appearance of the rotating shelf 300 is substantially flat and straight and substantially parallel to the corresponding part of the housing 200. According to this, it is beneficial to increase the storage capacity of the rotating shelf 300, and there is no need to add shelves for temporarily storing goods in the distribution station, and there is no need to sort the supplementary goods to the shelves for temporarily storing goods, the operation is convenient and the cost is relatively low.

Further, in this embodiment, the rotating wheel 320 can be selected as a sprocket, and accordingly, the transmission belt 330 can be selected as a chain. In other embodiments, the rotating wheel 320 and the transmission belt 330 may also adopt other cooperating transmission structures, such as the pulley and the belt, which are not limited to this embodiment.

As shown in FIGS. 1 and 3, based on the design of the rotating shelf 300 including two (or more than two) rotating shafts 310, and based on the design of the vertical column structure of the shelf units 340 shown in the drawings, in this embodiment, each time the rotating rack 300 moves, the number of the shelf units 340 corresponding to the goods access port 210 may be three rows. Accordingly, it is convenient for the operator to replenish the rotating shelf 300, and at the same time, the rotating frequency of the rotating container is effectively reduced when the user picks up the goods. In other embodiments, according to the number of the rotating shafts 310, or according to the demand for storing or taking out of goods, each time the rotating shelf 300 moves, the number of the shelf units 340 corresponding to the goods access port 210 can also be one row, two rows, or three rows or more, which is not limited to this embodiment.

Furthermore, as shown in FIGS. 3 to 6, in this embodiment, the shelf unit 340 has a plurality of goods storage grids 341 sequentially distributed in the vertical direction, correspondingly, the goods access ports 210 of the housing 200 is provided with a plurality of opening and closing doors 211, and these opening and closing doors 211 respectively correspond to the aforementioned goods storage grids 341. Accordingly, when goods need to be taken out or stored, the opening and closing door 211 at the corresponding position can be automatically opened, so that when the user opens the opening and closing door 211, the corresponding goods storage grid 341 can be exposed for the user to access goods.

Further, as shown in FIGS. 3 to 6, based on the design that the shelf unit 340 has a plurality of goods storage grids 341 sequentially distributed in the vertical direction, and at the same time, based on the design of a plurality of opening and closing doors 211 provided on the goods access port 210 of the housing 200, in this embodiment, the opening and closing doors 211 can be designed as multiple rows of door groups, and each row of the door group can be composed of a plurality of opening and closing doors 211 arranged sequentially in the vertical direction, and the multiple rows of door groups can be arranged adjacently or spaced apart. In addition, the number of the opening and closing doors 211 included in each row of door group is the same as the number of goods storage grids 341 of each shelf unit 340, the opening sizes of the opening and closing door 211 and the goods storage grid 341 are basically the same and their positions are corresponding, so as to ensure that the goods storage and replenishment operations can be completed for each grid on the rotating container through the goods access port 210.

Further, as shown in FIGS. 3 and 4, in this embodiment, the body (that is, each shelf unit 340) of the rotating shelf 300 is arranged next to the housing 200 and has a certain gap with the inner wall of the housing 200, so that the rotating shelf 300 can rotate unimpeded, thereby facilitating the storage and removal of goods through the goods access port 210, and sundries, packages, etc. will not easily fall into the gap between the rotating shelf 300 and the housing 200 due to errors.

Further, as shown in FIG. 6, in this embodiment, the driving mechanism 350 mainly includes a driving motor 351 and a driving belt 352. Specifically, the driving motor 351 is provided in the housing 200, for example, on the inner wall of the housing 200, and the driving motor 351 has an output end. The driving belt 352 is drivingly connected between the output end of the driving motor 351 and one of the two rotating shafts 310. Accordingly, the driving motor 351 can drive the rotating shaft 310 to rotate through the transmission of the driving belt 352, so as to drive the entire rotating shelf 300.

Further, as shown in FIG. 2, in this embodiment, a maintenance door 240 may be provided on the housing 200 for equipment maintenance personnel to enter and exit the distribution station.

Further, as shown in FIG. 2, based on the design that the maintenance door 240 has not been installed, in this embodiment, the maintenance door 240 may be provided on the other side of the housing 200 opposite to the side where the goods access port 210 is provided.

Further, as shown in FIGS. 1 and 2, based on the design of an access door 220 for the distribution vehicle 400 to enter and exit on the housing 200, in this embodiment, the access door 220 may be an automatic door. According to this, when the distribution vehicle 400 arrives outside the distribution station, the door is automatically opened, and the distribution vehicle 400 drives into the distribution station and stays at the position where the distribution vehicle 400 is parked.

In addition, in this embodiment, the access door 220 may be opened and closed by a control system 700. In addition, a cooperating identification mechanism may be provided on the distribution vehicle 400 and the distribution station (for example, the access door 220), and the identification mechanism can be connected to the control system 700. Accordingly, when the distribution vehicle 400 enters the recognition range of the above-mentioned identification mechanism, the control system 700 receives the identification signal sent by the identification mechanism, and correspondingly sends control signals to the access door 220 and the distribution vehicle 400 to control the distribution vehicle 400 to enter the access door 220. Conversely, when the distribution vehicle 400 drives out from the access door 220, it can also be implemented through the above-mentioned design and control ideas, which will not be repeated here.

Further, as shown in FIGS. 1 and 2, in this embodiment, a ramp 110 is provided at a position outside the base 100 corresponding to the access door 220 of the housing 200, in addition, the part of the base 100 located in the housing 200 is provided with a distribution vehicle channel, and the ramp 110 and the distribution vehicle channel are respectively located at the outer and inner sides of the access door 220. Where, the ramp 110 is generally a wedge-shaped mesa structure to compensate for the height difference between the external ground and the base 100, so as to facilitate the distribution vehicle 400 to enter or exit the distribution vehicle channel of the base 100 through the access door 220.

Further, in this embodiment, the distribution vehicle 400 may be an unmanned vehicle, in addition, the intelligent control center of the distribution vehicle 400 can be connected with the control system 700 of the distribution station, such as remote wireless connection through GPRS, WIFI, etc., so as to control the entry, exit and distribution of the distribution vehicle 400 through the control system 700.

As shown in FIG. 1, in this embodiment, the distribution station proposed in the present disclosure may also include a man-machine interface 230. Specifically, the man-machine interface 230 may be provided on the outer wall of the housing 200 for user operation. The man-machine interface 230 is connected with the control system 700 to construct information interaction between the man-machine interface 230 and the control system 700, so that the man-machine interface 230 is used for the user to input operational information such as goods access instructions, and the man-machine interface 230 converts the operation information into corresponding control signals and sends them to the control system 700, and the control system 700 sends out control instructions to complete the control of the corresponding mechanism.

Further, based on the design of the distribution station including the man-machine interface 230, in this embodiment, the man-machine interface 230 may use a touch screen. In other embodiments, other types of interactive apparatus or devices can also be selected according to actual usage requirements, and are not limited to this embodiment.

As shown in FIG. 7, in this embodiment, the sorting device 500 is provided on the base 100 and located in the housing 200, the sorting device 500 is further located between the distribution vehicle channel and the rotating shelf 300, and is used to move the goods on the rotating shelf to the distribution vehicle 400 (or vice versa).

As shown in FIGS. 5 and 7, in this embodiment, the distribution station may also include a rotating platform 600. Specifically, the rotating platform 600 is rotatably provided on the base 100 and located in the housing 200, the rotating platform 60) can adjust the direction of the distribution vehicle 400 by its own rotation when the distribution vehicle 400 is parked on the rotating platform 600. Accordingly, after the distribution vehicle 400 enters the distribution station through the access door 220, it can exit the distribution station through the access door 220 again without turning around. In addition, by using the rotating platform 600 to rotate the distribution vehicle 400, different sides of the distribution vehicle 400 can be directed toward the rotating shelf 300 or the sorting device 500, thereby, it is convenient to transport the goods to be picked up or stored between the rotating shelf 300 and the positions where the goods are placed on different sides of the distribution vehicle 400 (for example, through the sorting device 500).

Further, based on the design that the distribution station includes the rotating platform 600, in this embodiment, the rotating platform 600 can preferably be provided with a video monitoring device and can be connected to the control system 700. Accordingly, through the video monitoring device, the rotation angle of the distribution vehicle 400 on the rotating platform 600 can be monitored.

It should be noted here that the distribution stations shown in the drawings and described in this specification are just a few examples of many types of distribution stations that can adopt the principles of the present disclosure. It should be clearly understood that the principles of the present disclosure are by no means limited to any details of the distribution station or any components of the distribution station shown in the drawings or described in this specification.

For example, in another exemplary embodiment of the present disclosure, the goods access port may also be used as a window for automatically selling commodities (goods) supplied in the distribution station. Where, hot-selling goods can be placed in the goods storage grids of a part of the rotating shelf, when the customer inputs the designated purchase product information on the man-machine interface and completes the purchase interaction operation, the rotating shelf will rotate the shelf unit with the corresponding product to the position of the goods access port under the control of the control system 700. After that, the control system 700 controls the opening and closing doors corresponding to the goods to be sold to automatically open for the user to take away the goods.

For another example, in another exemplary embodiment of the present disclosure, the goods access port 210 can also be used as a window for users to send goods, when the user inputs the mailing information on the man-machine interface 230, the system will automatically assign an empty goods storage grid 341 to the user and control the shelf unit 340 where the goods storage grid 341 is located to rotate to the position of the goods access port 210, and control the opening and closing door 2111 corresponding to the empty goods storage grid 341 to open for the user to put the package in. The opening and closing door 211 is automatically closed after recognizing that the package is filled or placed in, or the user can manually close the opening and closing door 211.

In summary, in the distribution station proposed in the present disclosure, the housing is provided with a goods access port and an access door. The rotating shafts of the rotating shelf is vertically provided on the base, and the transmission belt is wound around the outer circumference of the rotating wheels provided on the rotating shafts. A plurality of shelf units are provided on the transmission belt, and are driven by a driving mechanism to expose the shelf units to the goods access port. The sorting device can pick and place goods between the distribution vehicle and the shelf units. Through the above design, the distribution station of the present disclosure can be used as a transit station for goods distribution, which can automatically sort, receive and send goods, and at the same time have functions such as self-pickup, sales, and sending goods, and satisfies various functions that need to be realized in the last mile of distribution, the distribution station of the present disclosure has low dependence on labor and high distribution efficiency.

Specifically, based on the above design of the present disclosure, the distribution station proposed in the present disclosure can at least provide the following functions.

1. The distribution station of the present disclosure can be used as a transit station for goods distribution, which can automatically sort, receive and send goods, and at the same time have functions such as self-pickup, sales, and sending goods, and satisfies basic function that need to be realized in the last mile of distribution. Since each functional component of the distribution station can adopt a modular design, it is convenient for overall transportation and installation, which effectively reduces the amount of on-site construction of the distribution station, and convenient for maintenance, and easy for scale and external promotion.

2. The rotating shelf can have both receiving and storing functions. That is, after the goods are stored in the goods storage grids, the rotating shelf is directly used as storage shelf. Moreover, due to the large storage capacity and the location of the rotating shelf in the distribution station is more reasonable, there is no need to sort the goods on other shelves, which effectively simplifies the storage ways of the distribution station and improves the convenience and processing efficiency.

3. The coordinated design of the rotating shelf and the goods access port better realizes the full utilization of all the goods storage grids on the rotating shelf, especially the design of the goods access port corresponding to the multi-row shelf units can make it more convenient for the distribution staff to replenish the goods in the distribution station, and at the same time effectively reduce the rotation frequency of the rotating container when the user picks up the goods.

4. The rotating shelf is designed to cooperate with the sorting device, and the sorting device proposed in the present disclosure can better complete the operation of picking up and placing goods on all the goods storage grids of the rotating shelf facing the sorting device.

5. The goods access port combines the functions of replenishment, self-pickup, sales and sending goods, which is diverse and versatile.

Although the present disclosure has been described with reference to a few typical embodiments, it should be understood that the terms used are illustrative and exemplary rather than restrictive. Since the present disclosure can be implemented in various forms without departing from the spirit or essence of the disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A distribution station, comprising:
   a base;
   a housing provided on the base and provided with a goods access port and an access door;
   a rotating shelf provided on the base and located in the housing, the rotating shelf comprising:
      a rotating shaft provided on the base vertically and provided with a rotating wheel concentric with the rotating shaft;
      a transmission belt wound around outer circumference of the rotating wheel;
      a plurality of shelf units provided on the transmission belt at intervals in a horizontal direction, and the shelf units are configured to store goods; and
      a driving mechanism connected to the rotating shaft in transmission, the driving mechanism is configured to drive the rotating shaft to rotate axially around itself, so that at least one of the plurality of shelf units corresponds to the goods access port;
   a distribution vehicle configured to enter and exit the housing through the access door and transport the goods;
   a sorting device provided on the base and located in the housing, the sorting device is configured to pick up and place the goods between the distribution vehicle and the shelf units; and
   a control system configured to control the driving mechanism and the sorting device,
   wherein the rotating shelf comprises a plurality of rotating shafts;
   the plurality of rotating shafts are arranged at intervals along a linear direction, heights of rotating wheels provided on the plurality of rotating shafts are the same, and the transmission belt is wound around a plurality of the rotating wheels,
   wherein the distribution station further comprises a rotating platform;
   the rotating platform is rotatably provided on the base and located in the housing;
   the rotating platform is configured to adjust a direction of the distribution vehicle through rotation of the rotating platform when the distribution vehicle is parked on the rotating platform, and the rotating platform and the base are in an identical horizontal plane.

2. The distribution station according to claim 1, wherein the rotating shelf comprises two rotating shafts.

3. The distribution station according to claim 1, wherein:
   each of the rotating shafts is provided with a plurality of rotating wheels located at different heights;
   the plurality of the rotating wheels provided on each of the rotating shafts have an identical number and the heights of the plurality of the rotating wheels on each of the rotating shafts are corresponding to each other;
   the plurality of the rotating wheels located at the same height of the plurality of the rotating shafts define a group of the rotating wheels;

a plurality of groups of the rotating wheels are respectively wound with a plurality of transmission belts, and each of the shelf units is provided on the plurality of the transmission belts.

4. The distribution station according to claim 3, wherein:
each of the rotating shafts is provided with two rotating wheels respectively located at a top end and a bottom end of each of the rotating shafts;
a transmission belt is wound around the plurality of the rotating wheels located at the top end of each of the plurality of the rotating shafts;
another transmission belt is wound around the plurality of the rotating wheels located at the bottom end of each of the plurality of the rotating shafts;
each of the shelf units is connected to two transmission belts.

5. The distribution station according to claim 1, wherein the rotating wheel is a sprocket, and the transmission belt is a chain.

6. The distribution station according to claim 1, wherein:
the shelf units are provided with a plurality of goods storage grids sequentially distributed in a vertical direction;
the goods access port is provided with a plurality of opening and closing doors;
the plurality of the opening and closing doors correspond to the plurality of the goods storage grids respectively.

7. The distribution station according to claim 6, wherein:
the distribution station further comprises a man-machine interface;
the man-machine interface is provided on the housing and connected to the control system;
the man-machine interface is configured for a user to input goods access instructions, and converting the goods access instructions into control signals and sending the control signals to the control system.

8. The distribution station according to claim 1, wherein:
the driving mechanism comprises a driving motor and a driving belt;
the driving motor is provided in the housing and is provided with an output end;
the driving belt is connected between the output end and the rotating shaft;
the driving motor is configured to drive the rotating shaft to rotate through a transmission of the driving belt.

* * * * *